United States Patent
Heiland

(10) Patent No.: US 6,308,557 B1
(45) Date of Patent: Oct. 30, 2001

(54) DEVICE SCANNING IN A RASTER MODE, WITH COMPENSATION OF DISTURBING EFFECTS OF MECHANICAL VIBRATIONS ON THE SCANNING PROCESS

(76) Inventor: Peter Heiland, Karl-Liebknecht-Strasse 30, D-65479 Raunheim (DE)

( * ) Notice: Subject to any disclaimer, the term of this patent is extended or adjusted under 35 U.S.C. 154(b) by 0 days.

(21) Appl. No.: 09/209,057

(22) Filed: Dec. 9, 1998

(30) Foreign Application Priority Data

Dec. 10, 1997 (DE) .............................................. 197 54 681

(51) Int. Cl.$^7$ ............................. G01D 3/28; G01B 21/16; G01B 21/30
(52) U.S. Cl. ................................ 73/105; 73/1.89; 250/306
(58) Field of Search .................................. 73/105, 866.1, 73/1.89, 1.82, 1.79; 250/306, 307

(56) References Cited

U.S. PATENT DOCUMENTS 5,049,745 * 9/1991 Rogen et al. ..................... 250/306 X
5,866,796 * 2/1999 Chic et al. ......................... 73/1.79 X

* cited by examiner

*Primary Examiner*—Thomas P. Noland

(57) ABSTRACT

A device which scans in a raster mode, in particular to a raster microscope, provides a rapid and inexpensive compensation of the disturbing effects of mechanical vibrations on the scanning process. The device includes a sensor for sensing mechanical vibrations and driving a filter whose output, together with the output of the device for the production of a z-signal, is connected to an adder, the output of which drives the device for changing the distance between the specimen and the sensor.

14 Claims, 1 Drawing Sheet

DEVICE SCANNING IN A RASTER MODE, WITH COMPENSATION OF DISTURBING EFFECTS OF MECHANICAL VIBRATIONS ON THE SCANNING PROCESS

CROSS-REFERENCES TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The invention relates to a device that scans in a raster mode, particularly a raster microscope, with compensation of the disturbing effects of mechanical vibrations on the scanning process.

Devices which scan a specimen in a raster scanning process have achieved great importance in recent years, particularly in the high resolution investigation of specimens, and above all because of improved displacement devices, for example, highly accurate piezo translators, and the advancing development in the production of sensors and sensing elements which, according to the form of embodiment, receive a tunnel current or indicate the action of a force. The topography of a specimen can easily be surveyed, or locally resolved bonding conditions, for example of macromolecules, can be disclosed. Here resolutions down to the nanometer or subnanometer range are attained. For this reason, the actual resolving ability of such devices depends strongly on the external effects from the surroundings. A large role is played here by mechanical vibrations, for example, air vibrations or also bodily vibrations, which can be produced by movements of the building, for example. The disturbing motions produced in this manner, for example those of the microscope table on which the specimen is supported, can easily be of the order of several micrometers, which corresponds to a signal to noise ratio of $<10^{-3}$. The high resolution of the devices can thus be only used when the disturbing effect is reduced by corresponding devices.

2. Discussion of Relevant Art

According to the state of the art, active or passive vibration damping or vibration insulating devices are used, for example. However, such devices are very expensive. Particularly at very low disturbing frequencies, such as can arise, for example, from vibrations of buildings, these devices moreover offer only a limited protection. In addition, such systems are extremely slow, because of their intrinsic vibration behavior.

SUMMARY OF THE INVENTION

The invention thus has as its object to provide a device, which does not have the disadvantages of the devices according to the state of the art.

This is provided surprisingly easily by means of a device according to the present invention. Accordingly, the device which scans in a raster mode includes a sensor that senses mechanical vibrations and drives a filter whose output is connected to an adder together with the output of the device for producing a signal for adjusting the distance between a specimen and a scanning sensor, wherein the output of the adder controls the device for changing the distance between the specimen and the sensor, so that the disturbing effects of mechanical vibrations on the scanning process are substantially compensated.

The financial cost for a device according to the invention, in particular for removing the disturbing effects of mechanical vibrations, is minimal in comparison with the devices according to the state of the art. Since only electrical components are used besides the sensor for sensing the mechanical vibrations, the response to external disturbances is extremely fast, and furthermore is not limited by the intrinsic vibration properties of other mechanical devices.

If the filter is adjustable and the output of the adder is connected to the control input of the filter, the output signal of the adder can be kept substantially constant over time by this feedback, by the adaptation of the filter, and thus the effect of mechanical vibrations on the scanning process can be automatically compensated. In order to separate the effect of the disturbance on the measurement signal from a real change of the measurement value because of "bringing up" another measurement point on the specimen, the adaptation or the equalization of the filter is carried out at points in time at which the displacement device is not active and the measurement process for the corresponding point on the specimen has been concluded.

In order to simplify the adaptation of the filter, the filter can be digitally constructed. The arrangement of the sensor for sensing the mechanical vibrations can be optimized for the respective construction; for example, the sensor can be installed on a microscope table on which the device is supported which scans in a raster mode, the sensor being arranged adjacent to the specimen in order to sense the mechanical vibrations. In given cases it is however also possible to arrange this sensor at a remote place, for example on the floor on which the microscope table is supported.

The sensor for sensing the mechanical vibrations can pick up the displacement and/or the acceleration of the associated vibration, according to requirements. Sensing of the acceleration makes possible a more rapid reaction of the system to the disturbance.

According to the degree of compensation required, a vibration sensor for sensing the mechanical vibrations can be extended substantially perpendicular to the plane of displacement; however, a vibration sensor can also be used which senses vibrations in three axes. This enables disturbances to be sensed which, for example, bring about a displacement of the specimen and the sensor relative to each other in the plane of displacement. This also relates in particular to disturbing vibrations which are produced by the device itself, e.g., by the displacement device which moves the sensor over the specimen, for example.

If the three outputs of the three-axis vibration sensor are respectively connected to the input of a filter, the outputs of the filters being connected to the adder, the disturbances of the measurement signal can be taken into account and compensated for all three spatial directions. If all the filters are respectively adjustable, and the output of the adder is respectively connected to the control input of the filter, the signal at the output of the adder is effectively substantially constant over time, by means of the adaptation of the individual filters, and all disturbances which are brought about by vibrations are substantially compensated.

The device according to the invention can be used for all devices which scan in the raster mode. This relates in particular to force microscopes, for example "atomic force" microscopes or "van der Waals" microscopes, and also electronic and optical scanning tunneling microscopes.

There is furthermore the possibility of modifying, according to the invention, existing devices which scan in a raster mode, or of combining the device according to the invention with mechanical vibration damping and insulating devices.

BRIEF DESCRIPTION OF THE DRAWINGS

The invention is explained hereinbelow by the description of a few embodiments, with reference to the accompanying drawing.

DETAILED DESCRIPTION OF PREFERRED EMBODIMENTS

Figure 1:
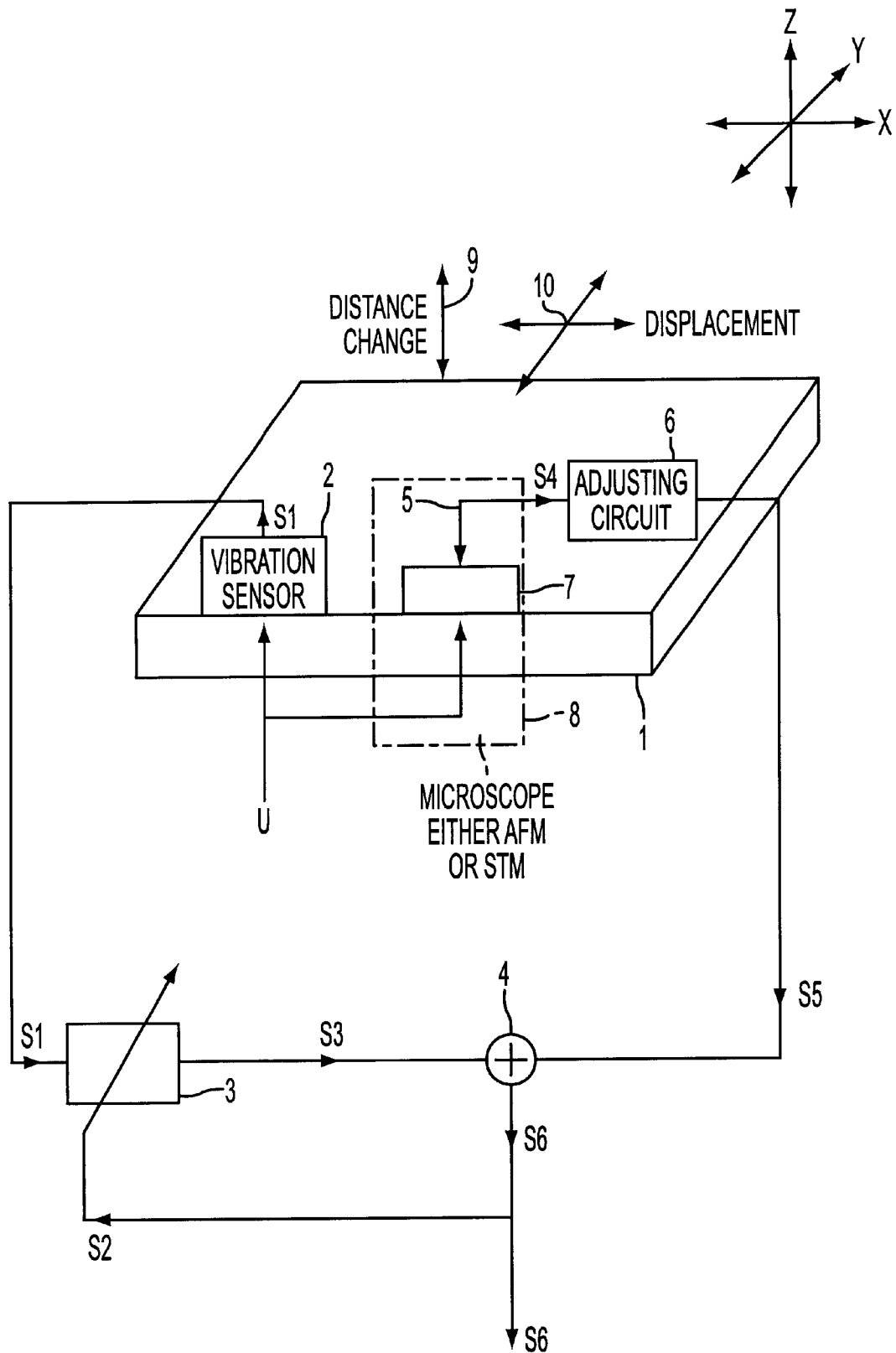
FIG. 1 shows schematically a device according to the invention.

The device according to the invention shown in FIG. 1 scans in a raster mode with a compensation of the disturbing effects of mechanical vibrations on the scanning process, and includes a sensor 5 for providing a measurement signal S4 that depends on the distance of the sensor to a specimen 7 supported on a microscope table 1.

The measurement signal S4 is supplied to an electronic circuit 6 that produces an adjusting signal S5 to change the distance between the respective measurement region, or the respective measurement point, on the specimen, to the sensor. This adjusting signal S5 is however not supplied directly to the device for changing the distance between the specimen and the sensor, as in the devices according to the state of the art, but is supplied to an adder 4. The device according to the invention furthermore includes a sensor 2 which senses mechanical vibrations and whose output signal Si drives the-input of a filter 3, the output of which is also connected to the adder 4. The adder 4 thus adds the signal S3 from the filter and the signal S5 from the device for producing the adjusting signal, to give a signal S6. The equalization of the filter gives a resulting signal S6 that is substantially independent of time and thus independent of the disturbance. The specimen is displaced by driving a displacement device for displacement in a raster mode of the specimen 7 and/or of the sensor 5, according to the embodiment, and thereby traces its topography.

After the change of the relative position of the specimen and the sensor in a plane that, in one embodiment of the invention, is substantially parallel to the microscope table, a new point on the specimen in sensed, and in an embodiment a setting is again made to a constant measurement signal S4, by changing the relative distance of the specimen and the sensor to each other, substantially perpendicularly to the above-mentioned plane. The relative change of the distance of the specimen and sensor is an absolute measure for the height difference of the two neighboring measurement points on the specimen.

In an embodiment of the invention, the filter 3 is constructed to be adjustable, the output of the adder 4 being connected to the control input of the filter. Thus the sum signal S6 also acts as an error signal for the setting of the parameter of the adaptive filter 3. Since this feedback is effected purely electronically, a more rapid adjustment of the filter is attained in comparison with the mechanical feedback system, such that the signal S6 is substantially constant over time when the displacement device of the apparatus is not active. The filter 3 can be constructed as an analog or a digital filter, according to the embodiment of the invention.

The sensor 2 for sensing mechanical vibrations is arranged in the neighborhood of the specimen. The exact position plays a subordinate role. In each case, however, the disturbance U must have an effect both on the relative position between the specimen and the sensor 5 and also on the signal of the sensor 2. The vibration sensor 2 can be embodied both as a translation sensor and as an acceleration sensor. In a special embodiment of the invention, the vibration sensor is of three-axis construction and thus senses vibrations both in the plane of displacement and also perpendicular to it. The three outputs of the sensor are respectively connected to an input of a filter, the outputs of the filters all being connected to the adder 4. The signal S6 for setting the distance between the specimen 7 and the sensor 5 is made substantially constant over time by setting the respective filter, as attained hereinabove. An automatic compensation of the disturbances brought about by the mechanical vibrations in the three spatial directions, and respectively having effects on the relative distance between the specimen and the sensor 5 and thus on the measurement signal S4, are effectively compensated in a special embodiment of the invention in which the three filters are adjustable and the output of the adder is respectively connected to the control input of the filter. By automatic adaptation of the parameters of the three digital filters, it is insured that at each point in time at which the displacement device is not in action, the signal S6 substantially does not vary with time.

The device according to the invention can be a force microscope according to the embodiment, for example, an "atomic force" microscope, or a "van der Waals" microscope, or else a raster tunneling microscope, for example, an electron scanning tunneling microscope, or an optical raster tunneling microscope. In the case of an "atomic force" microscope, the sensor 5 includes a sensing element on a lever arm, which is set in vibration. The distance of the specimen point and the sensing element can change on scanning, due to the relative displacement of the specimen and the sensor to each other in the horizontal direction. This change of distance causes detuning of the vibrating lever arm as a consequence, which is again made a feedback by the changing of the vertical distance between the sensing element and the measurement point on the specimen surface.

The scanning microscope according to the invention is a tunnel microscope or a force microscope that includes both a displacement device and a distance changing device. The specific mechanical portions of the displacement device and the distance changing device are well known to a person familiar with the art and not shown in detail in FIG. 1.

The directions of movement 10, 9 provided by the displacement device and the distance changing device by a perspectively shown X-Y-Z coordinate system within FIG. 1

The displacement device provides a two-dimensional scanning of the surface of specimen 7 by sensor 5 in the X-Y-plane (wherein Y is the direction perpendicular to the paper plane).

The distance changing device changes the distance between the specimen 7 and the sensor 5 preferably in the Z-direction, which is perpendicular to the X-Y-plane.

Essentially the whole device shown in FIG. 1 represents the microscope according to the invention including means for compensation of disturbing effects.

A microscope, which does not embody the invention, i.e. according to prior art, could merely include a sensor 5, a specimen 7 and possibly a table 1.

In order to determine, for example, the topography of a specimen, the measurement signal S4 is picked up by the sensing element and depends on the distance of the respective measurement point on the specimen to the sensing element, while the scanning of the specimen is kept constant. This can be attained in that after the "bringing up" of a new measurement point to the sensing element, the distance between the respective measurement point and the sensing element is altered such that the measurement signal has a definite predetermined value. Since a predetermined measurement signal S4 corresponds to a given distance of the sensor from the measurement point on the specimen, the device is thus always controlled to a fixed distance of the sensor from the respective measurement point.

If now after the "bringing up" of a new measurement point the distance between the sensor and the new measurement point is changed over a path length, this means that the new measurement point relative to the old measurement point lies respectively higher or lower in the z-direction by exactly this path length than the previous measurement point. The device for the production of an adjusting signal for changing the distance between the sensor 5 and the specimen 7 produces for this purpose the z-signal S5, which can have components which vary with time due to mechanical vibrations. As already mentioned hereinabove, this signal S5 is added together with the signal S3 from the filter 3 in the adder 4, in which the adjusting signal S6 for changing the distance between the sensor 5 and the specimen 7 is produced and is substantially constant over time.

With ideal adaptation of the filter 3, the filter produces from the input signal S1 a signal S3, which is quantitatively equal to the time-varying portion of the signal S5 but with the sign reversed, so that both components cancel exactly. The disturbances in the distance of the sensing element from the sensing place on the specimen surface, brought about by mechanical vibrations, are in this manner substantially compensated according to the invention.

The adaptation of the filter 3 can be carried out at each measurement point or at predetermined time intervals, according to the embodiment of the invention. During the scanning process itself, i.e., during the displacement of the specimen relative to the sensor 5 in a plane, which lies substantially perpendicular to the z-direction, the previously established parameters for setting the filter 3 are maintained.

I claim:

1. A device that scans in raster mode, with compensation of disturbing effects of mechanical vibrations on the scanning process, comprising:
    a scanning sensor (5) that provides a measurement signal (S4) that depends on the distance of said scanning sensor (5) from a specimen (7),
    a displacement device that displaces said specimen (7) and said scanning sensor (5) relative to each other
    a distance changing device that changes the distance between said specimen (7) and said scanning sensor (5),
    an adder (4),
    a device (6) connected after said scanning sensor (5) that provides an adjusting signal (S5) for adjusting said distance between said specimen (7) and said scanning sensor (5) to said adder (4),
    a vibration sensor (2) that senses mechanical vibrations, and
    a filter (3) driven by said vibration sensor (2), the output of which, together with the output of said device (6) is connected to said adder (4),
    wherein the output of said adder (4) drives said distance changing device that changes the distance between said specimen (7) and said scanning sensor (5).

2. The device according to claim 1, in which said displacement device displaces at least one of said specimen (7) and said scanning sensor (5) substantially in a displacement plane, and said distance changing device changes said distance between said specimen (7) and said sensor (5) in a direction that is substantially perpendicular to said displacement plane.

3. The device according to claim 1, in which said filter (3) is adjustable and has a control input, and the output of said adder (4) is connected to said control input of said filter (3).

4. The device according to claim 1, in which said filter (3) comprises a digital filter.

5. The device according to claim 1, in which said vibration sensor (2) is arranged adjacent to said specimen (7).

6. The device according to claim 1, in which said vibration sensor senses displacement or acceleration of mechanical vibration.

7. The device according to claim 1, in which said vibration sensor (2) senses mechanical vibrations substantially perpendicular to the plane of displacement of said displacement device.

8. The device according to claim 1, in which said vibration sensor (2) senses mechanical vibrations in three axial directions, and three outputs of said vibration sensor (2) associated with said three axial directions are connected to respective filters driven by said vibration sensor (2), the outputs of said filters being connected to said adder (4).

9. The device according to claim 8, in which said filters are adjustable and include control inputs, and the output of said adder is respectively connected to said control inputs of said filter.

10. The device according to claim 1, in which said device comprises a force microscope or a tunnel microscope.

11. A process for operation of a device that scans in a raster mode with compensation of disturbing effects of mechanical vibrations on the scanning process, comprising:
    displacing a scanning sensor (5) relative to a specimen (7),
    sensing and providing measuring signals depending on the distance of said scanning sensor (5) from said specimen (7),
    sensing mechanical vibrations by a vibration sensor (2),
    driving a filter (3) by sensed signals from said vibration sensor (2),
    applying output signals from said filter (3) together with output signals from a device (6) that provides an adjusting signal to the input of an adder (4), and
    applying output signals of said adder (4) to control a device for changing said distance between said specimen (7) and said scanning sensor (5) to substantially compensate for the disturbing effect of mechanical vibrations.

12. The process according to claim 11, further comprising keeping scanning measurement signals (S4) from said scanning sensor (5) constant during displacement of said specimen (7) relative to said scanning sensor (5) by changing the distance between said specimen (7) and said scanning sensor (5).

13. The process according to claim 11, further comprising adjusting said filter (3) by output signals of said adder (4) such that in the adjusted state the output signals of said adder are substantially constant over time.

14. The process according to claim 11, further comprising adjusting said filter (3) at times when a device that displaces said specimen (7) relative to said scanning sensor (5) is inactive.

* * * * *